(12) United States Patent
Joseph Stephen Max

(10) Patent No.: US 12,405,994 B2  
(45) Date of Patent: Sep. 2, 2025

(54) GENERATIVE MACHINE-LEARNED MODELS FOR IDENTIFYING OPTIMAL USER-GENERATED REPRESENTATION IMAGES

(71) Applicant: Google LLC, Mountain View, CA (US)

(72) Inventor: Lenord Melvix Joseph Stephen Max, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/393,110

(22) Filed: Dec. 21, 2023

(65) Prior Publication Data

US 2025/0209113 A1 Jun. 26, 2025

(51) Int. Cl.
*G06F 16/00* (2019.01)
*G06F 16/532* (2019.01)

(52) U.S. Cl.
CPC .................. *G06F 16/532* (2019.01)

(58) Field of Classification Search
CPC .... G06F 16/583; G06F 18/22; G06F 16/5838; G06F 16/51; G06F 16/54; G06F 16/55; G06F 3/013; G06F 16/50; G06F 18/2323; G06F 18/254; G06F 16/73; G06F 18/2148; G06F 18/41; G06F 3/167; G06F 16/3322; G06F 16/5854; G06F 18/23; G06F 18/28; G06F 16/24578; G06F 16/248; G06F 16/287; G06F 16/5866; G06F 3/017; G06F 3/041; G06F 3/0488; G06F 16/29; G06F 16/56; G06F 16/5846; G06F 16/587; G06F 18/24; G06F 18/2413; G06F 40/134; G06F 16/535; H04N 21/4828; H04N 23/64; G06V 10/993

See application file for complete search history.

(56) References Cited

U.S. PATENT DOCUMENTS

| | | | |
|---|---|---|---|
| 8,880,535 B1 * | 11/2014 | Agarwal | G06F 16/24578 707/748 |
| 9,710,829 B1 * | 7/2017 | Sitapara | G06Q 30/0276 |
| 2011/0107239 A1 * | 5/2011 | Adoni | A63F 13/60 726/8 |
| 2019/0236098 A1 * | 8/2019 | Bhotika | G06F 16/287 |
| 2022/0327147 A1 * | 10/2022 | Shi | G06F 16/29 |
| 2023/0400327 A1 * | 12/2023 | Streem | G06V 10/761 |
| 2024/0177836 A1 * | 5/2024 | Paik | G06T 7/0012 |

* cited by examiner

*Primary Examiner* — Shyue Jiunn Hwa
(74) *Attorney, Agent, or Firm* — DORITY & MANNING P.A.

(57) ABSTRACT

One or more visual descriptors for a particular Point of Interest (POI) are extracted from a corpus of User-Generated Content (UGC), wherein the corpus of UGC comprises a plurality of textual content items descriptive of the particular POI. Based on the one or more visual descriptors, a machine-learned generative vision model is used to generate a query image that depicts the particular POI. A visual similarity is determined between the query image and each of a plurality of candidate images of a corpus of visual UGC that depicts the particular POI. A representation image is selected from the plurality of candidate images to represent the particular POI based on the visual similarity between the representation image and the query image.

20 Claims, 9 Drawing Sheets

GENERATIVE MACHINE-LEARNED MODELS FOR IDENTIFYING OPTIMAL USER-GENERATED REPRESENTATION IMAGES

FIELD

The present disclosure relates generally to identifying optimal representation images. More specifically, the present disclosure relates to leveraging generative machine-learned models to identify optimal user-generated images to represent particular Points of Interests (POIs).

BACKGROUND

Application-based services are increasingly ubiquitous in the modern world. An application-based service generally provides a service to a user via an application executed by the user's device. Examples of such services include mapping services, aggregation services (e.g., for user reviews, etc.), visual search services, etc. One benefit provided by such services is enabling the exchange of User-Generated Content (UGC). For example, a mapping service may maintain "profiles" for various Points of Interest (POIs) (e.g., restaurants, landmarks, geographic areas, businesses, etc.).

Profiles for POIs serve to aggregate and catalogue UGC submitted for the POI. In addition, for many application-based services, profiles for POIs generally include "overview" information that is presented first to the user to provide a high-level overview of the POI. Such overview information generally includes information describing the POI (e.g., business hours for a business, a menu for a restaurant, highlighted sentences from popular user reviews, etc.) and a representation image that serves as a visual "summary" of the POI. For example, the representation image included in a mapping service profile for a restaurant may be a panoramic depiction of the interior of the restaurant, a depiction of the front entrance to the restaurant, an image of a signature dish served by the restaurant, etc.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes extracting, by a computing system comprising one or more processor devices, one or more visual descriptors for a particular Point of Interest (POI) from a corpus of User-Generated Content (UGC), wherein the corpus of UGC comprises a plurality of textual content items descriptive of the particular POI. The method includes, based on the one or more visual descriptors, using, by the computing system, a machine-learned generative vision model to generate a query image that depicts the particular POI. The method includes determining, by the computing system, a visual similarity between the query image and each of a plurality of candidate images of a corpus of visual UGC that depicts the particular POI. The method includes selecting, by the computing system, a representation image from the plurality of candidate images to represent the particular POI based on the visual similarity between the representation image and the query image.

Another example aspect of the present disclosure is directed to a computing system. The computing system includes one or more processor devices. The computing system includes one or more tangible, non-transitory computer readable media storing computer-readable instructions that when executed by the one or more processor devices cause the one or more processor devices to perform operations. The operations include extracting one or more visual descriptors for a particular POI from a corpus of UGC, wherein the corpus of UGC comprises a plurality of textual content items descriptive of the particular POI. The operations include, based on the one or more visual descriptors, using a machine-learned generative vision model to generate a query image that depicts the particular POI. The operations include determining a visual similarity between the query image and each of a plurality of candidate images of a corpus of visual UGC that depicts the particular POI. The operations include selecting a representation image of the plurality of images to represent the particular POI based on the visual similarity between the representation image and the query image.

Another example aspect of the present disclosure is directed to one or more tangible, non-transitory computer readable media storing computer-readable instructions that when executed by one or more processor devices cause the one or more processor devices to perform operations. The operations include extracting one or more visual descriptors for a particular POI from a corpus of UGC, wherein the corpus of UGC comprises a plurality of textual content items descriptive of the particular POI. The operations include, based on the one or more visual descriptors, using a machine-learned generative vision model to generate an embedding from which a query image that depicts the particular POI can be generated. The operations include determining a similarity between the embedding and each of a plurality of embeddings that respectively represent a plurality of candidate images of a corpus of visual UGC that depicts the particular POI. The operations include selecting a representation image of the plurality of images to represent the particular POI based on the similarity between the embedding and each of the plurality of embeddings.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
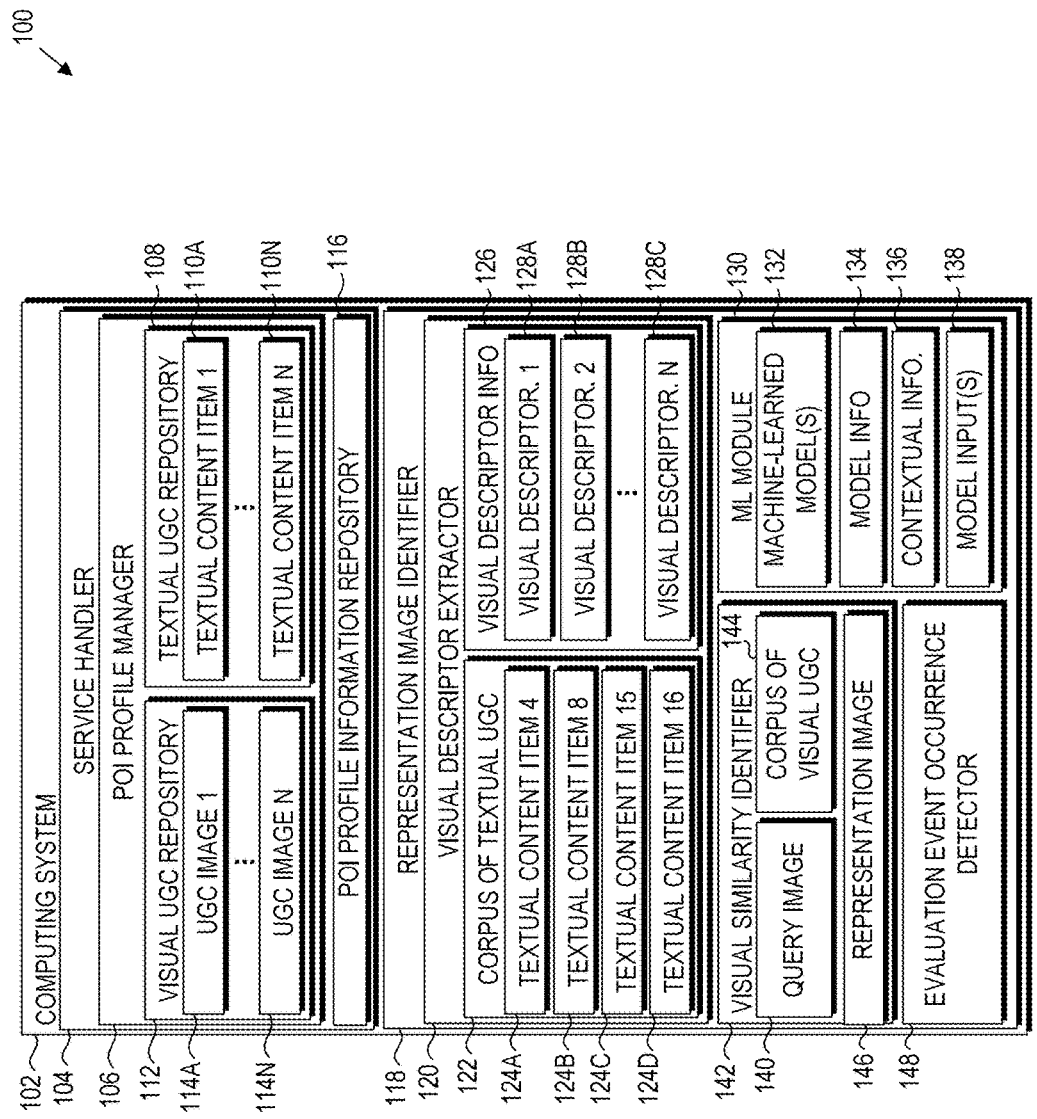
FIG. 1 is an overview block diagram of a computing system for generative machine-learned models to identify optimal user-generated images to represent particular POIs according to some implementations of the present disclosure.

Reference numerals that are repeated across plural figures are intended to identify the same features in various implementations.

DETAILED DESCRIPTION

Generally, the present disclosure is directed to identifying optimal representation images. More specifically, the present disclosure relates to leveraging generative machine-learned models to identify optimal user-generated images to represent particular Points of Interests (POIs). Application-based services are increasingly ubiquitous in the modern world. An application-based service generally provides a service to a user via an application executed by the user's device. Examples of such services include mapping services, aggregation services (e.g., for user reviews, etc.), visual search services, etc. One benefit provided by such services is enabling the exchange of User-Generated Content (UGC). For example, a mapping service may maintain "profiles" for various Points of Interest (POIs) (e.g., restaurants, landmarks, geographic areas, businesses, etc.).

Profiles for POIs serve to aggregate and catalogue UGC submitted for the POI. In addition, for many application-based services, profiles for POIs generally include "overview" information that is presented first to the user to provide a high-level overview of the POI. Such overview information generally includes information describing the POI (e.g., business hours for a business, a menu for a restaurant, highlighted sentences from popular user reviews, etc.) and a representation image that serves as a visual "summary" of the POI. For example, the representation image included in a mapping service profile for a restaurant may be a panoramic depiction of the interior of the restaurant, a depiction of the front entrance to the restaurant, an image of a signature dish served by the restaurant, etc.

Representation images are usually selected from UGC images submitted in association with a particular POI. For example, users of mapping services often capture images while dining at a restaurant and upload the images along with a review of the restaurant to the mapping service. Conventional approaches select representation images for POIs based on a number of signals, such as interaction metrics for UGC images, feedback from a representative of a POI, image quality metrics, recency, etc.

However, while conventional approaches are successful in selecting "popular" images with frequent interactions, such images often serve as poor representation images for POIs. In some instances, a "popular" image can instead mis-represent a particular POI. For example, assume that the most popular UGC image for a restaurant depicts a close-up of a signature menu item. Although popular, the image gives no indication of the aesthetic, atmosphere, exterior appearance, etc. of the restaurant, and therefore may serve as a poor representation image for the POI. Furthermore, conventional approaches often exhibit poor performance with regards to the temporal and/or contextual relevance of images. Specifically, conventional approaches are generally incapable of changing the representation image for a POI based on a planned event, a change in seasonal weather, etc. For example, assume that the POI is a national park that is renowned for vibrant fall foliage. Conventional approaches are unlikely to change an existing representation image to one captured in a previous fall season to highlight such foliage.

Accordingly, implementations of the present disclosure propose generative machine-learned models to identify optimal user-generated images to represent particular POIs. More specifically, a computing system (e.g., a system associated with an application-based service) can maintain a corpus of UGC submitted by users for a particular POI. The corpus of UGC can include textual content items that describe the POI (e.g., reviews for the POI, frequently asked questions/answers for the POI, a summary or overview of the POI, POI-specific and/or POI-submitted information, etc.). The corpus of UGC can also include a plurality of images that depict various portions or characteristics of the POI. For example, if the POI is a restaurant, the corpus of UGC may include images of the restaurant exterior, interior, various menu items, special events occurring at the restaurant, etc.

The computing system can extract visual descriptors for the particular POI from the corpus of UGC. As described herein, a "visual descriptor" can be a word, phrase, sentence, etc. that describes a visual characteristic of the POI, a good or service provided by the POI, an activity performed at the POI, a person associated with the POI, etc. For example, if the POI is a national park, visual descriptors can be extracted such as "hike," "fall leaves," "lots of flowers in summer," "beautiful view from the mountain," etc.

Based on the visual descriptors, the computing system can use a machine-learned generative vision model to generate a query image that depicts the particular POI. More specifically, the computing system can process the visual descriptors, or an intermediate representation of the visual descriptors, with a machine-learned generative vision model to generate an image that depicts the POI based on the visual descriptors. For example, based on visual descriptors "fall leaves" and "beautiful view from the mountain" for a national park, the generated image may depict a mountain covered in fall foliage.

In this manner, the computing system can generate an image that can serve as an "ideal" image to identify visually similar images within the corpus of UGC images. More specifically, the computing system can determine a visual similarity between the query image (e.g., the image generated using the generative vision model) and the images included in the corpus of UGC. By identifying the UGC image most visually similar to the "ideal" query image, the computing system can identify an optimal representation image for the POI.

To follow the previous example, one of the images included in the corpus of UGC may be an image depicting the national park during peak fall foliage season that was uploaded years ago by a user. A conventional image selection technique is unlikely to select such an image due to the length of time that has passed since the image was captured. However, implementations of the present disclosure can select this image due to the visual similarity between the image and the "ideal" query image. In this manner, the computing system can more accurately and effectively identify a representation image for a POI based on a semantic, contextual understanding of the POI extracted from textual content items and other UGC.

Implementations of the present disclosure provide a number of technical effects and benefits. As one example technical effect and benefit, implementations described herein more accurately and effectively identify query images for POIs. In addition, implementations described herein enable more dynamic selection of hero images based on temporal context. For example, if the owner of a venue provides information indicating that an electronic music artist is scheduled to play at the venue, the implementations described herein can be leveraged to temporarily select a representation image that corresponds to the upcoming event (e.g., from a previous electronic music artist, etc.).

With reference now to the Figures, example implementations of the present disclosure will be discussed in further detail.

FIG. 1 is an overview block diagram 100 of a computing system for generative machine-learned models to identify optimal user-generated images to represent particular POIs according to some implementations of the present disclosure. Specifically, a computing system 102 (e.g., physical computing device(s), virtualized computing device(s), etc.) can include a service handler 104 that provides or implements application-based service(s), or component(s) of application-based service(s) or the corresponding application(s). For example, the service handler 104 can provide or implement mapping services, navigation services, visual search services, etc.

The service handler 104 can include a POI profile manager 106. The POI profile manager 106 can create, modify, and maintain profile information for various POIs. Specifically, some application-based services (e.g., navigation services) maintain profile information for POIs that can be discovered within the application-based service. For example, POIs such as restaurants, stores, and other businesses can be discovered through application-based services such as navigation services, visual search services, etc. A profile can include information that describes various characteristics of a POI, such as working hours, phone numbers, associated websites, etc. A profile can also store UGC submitted by users who visited the POI. For example, a profile for a restaurant in a navigation or mapping application can include user-submitted reviews, images of meals served to users, etc.

The POI profile manager 106 can include a textual UGC repository 108. The textual UGC repository 108 can store textual content items 110A-110N (generally, textual content items 110) submitted by users for the POI. The textual content items 110 can include any type or manner of textual content, including reviews, questions/answers, summaries, excerpts from other textual sources, quotes, etc. In some implementations, the textual content items 110 can include information extracted from a website, social media profile, application profile, etc. associated with the particular POI. In some implementations, the textual content items 110 can be the output of a text conversion technique that is applied to some other form of user-generated content. For example, a textual content item can be the output of a speech recognition technique applied to user-generated audio content. For another example, the textual content item can be the output resulting from processing a UGC image with a machine-learned semantic image recognition model that is trained to generate a textual description of an input image.

The POI profile manager can include a visual UGC repository 112. The visual UGC repository 112 can include any visual or audiovisual content submitted by users for the POI (e.g., images, animations, videos, Mixed Reality (MR) information, etc.). In particular, the visual UGC repository 112 can include UGC images 114A-114N (generally, UGC images 114). The UGC images 114 can depict the POI, certain portion(s) of the POI, or subjects related to the POI (e.g., a menu at a restaurant, the logo of a business, a service provider providing a service, etc.).

The POI profile manager 106 can include a POI profile information repository 116. The POI profile information repository 116 store information displayed within the profile of the POI, and/or metadata related to the POI. For example, assume the computing system 102 is associated with a mapping or navigation service. The POI profile information repository 116 can include profile information for the profile of a business that can be discovered using the navigation service. The profile information stored in the repository 116 can include hours in which the business is open, an address for the business, coordinates for the business, an associated website, etc. In some implementations, the POI profile information repository 116 can include contextual information that is specific to the POI, and/or to the type of POI.

As described previously, the service implemented by the service handler can maintain representation images to represent various POIs. A representation image can serve as a "visual summary" of the POI (or a good or service associated with the POI) to a user that browses the profile of the POI. Representation images are generally displayed in a place of prominence within the profile of the POI to draw the user's attention. For example, the representation image for an amusement park might depict the most well-known ride in the park. For another example, the representation image for a restaurant may depict the logo of the restaurant, a popular dish served by the restaurant, the interior of the restaurant, etc.

The computing system 102 can include a representation image identifier 118 to optimally select representation images for POIs. The representation image identifier 118 can identify optimal representation images from the existing UGC images 114 of the visual UGC repository 112. To do so, the representation image identifier 118 can include a visual descriptor extractor 120. The visual descriptor extractor 120 can extract visual descriptors from the textual content items 110 included in the textual UGC repository 108.

The visual descriptor extractor 120 can include a corpus of textual UGC 122. The corpus of textual UGC can include selected textual content items 124A-124D (generally, selected textual content items 124). In some implementations, the selected textual content items 124 can include each of the textual content items 110 from the textual UGC repository 108. The textual content items 124

Alternatively, in some implementations, the visual descriptor extractor 120 can filter one or more of the textual content items 110 from the selected textual content items 124. In some implementations, the textual content items 110 can be filtered based on user feedback submitted for the textual content items 110. For example, the POI profile information repository 116 can include feedback information submitted by users for the textual content items 110. If the feedback information for textual content item 110A is indicative of negative feedback, or some particular feedback metric, the visual descriptor extractor 120 can filter the textual content item 110A, or can otherwise refrain from selecting the textual content item 110A for inclusion in the selected content items 124. Additionally, or alternatively, in some implementations, the visual descriptor extractor 120 can filter textual content items 110 based on other criteria, such as inappropriate or insensitive language, predicted marketing content, predicted malicious content, predicted inaccuracies, etc.

The visual descriptor extractor 120 can extract visual descriptors from the selected textual content items 124 of the corpus of textual UGC 122. More specifically, the visual descriptor extractor 120 can generate visual descriptor information 126. The visual descriptor information 126 can include visual descriptors 128A-128N (generally, visual descriptors 128). As described herein, a "visual descriptor" can be word(s), sentence(s), phrase(s), etc. that describe visual characteristics of the POI, and/or services or goods associated with the POI. For example, the visual descriptors 128 extracted for a candy shop POI are likely to include words such as "colorful," "fun," etc., while the visual descriptors 128 for a national park are likely to include words such as "scenic" or "breathtaking."

In some implementations, the visual descriptor extractor 120 can extract the visual descriptors 128 using conventional extraction techniques. For example, the visual descriptor extractor 120 may perform a search process to search for known visual descriptors. Additionally, or alternatively, in some implementations, the visual descriptor extractor 120 can extract the visual descriptors 128 using machine-learning techniques. For example, the visual descriptor extractor 120 can process the corpus of textual UGC 122 and a prompt describing instructions to extract the visual descriptors 126 from the selected textual content items 124.

The representation image identifier 118 can include a machine learning module 130. The machine learning module 130 can train, store, instantiate, optimize, and otherwise implement a variety of machine-learned model(s) 132. The machine learning module 130 can include model information 134. The model information 134 can include prompts, versioning information, update information, file paths, etc. for implementing the machine-learned models 132.

In some implementations, the machine-learned model(s) 132 can include at least a portion of a machine-learned language model, such as a Large Language Model (LLM). For example, the machine-learned model(s) 132 can include a trained encoder portion of an LLM that is trained to process textual content to generate an intermediate representation of the textual content. In some implementations, the trained encoder portion of the LLM can be a portion, or sub-model, of a multimodal model. For example, the multimodal model may include the trained encoder portion of the LLM alongside analogous encoder portions for vision tasks, audio tasks, etc. In some implementations, the trained encoder portion of the LLM can be trained such that the intermediate representation output by the encoder portion can be processed by the decoder portion of a machine-learned computer vision model.

More specifically, the machine-learned model(s) 132 can include a machine-learned computer vision model trained to perform generative image tasks. In other words, the machine-learned computer vision model can be trained to generate a requested image based on a description of the requested image. In some implementations, the trained encoder portion of the LLM can be trained in a manner such that output of the trained encoder portion is compatible with the machine-learned computer vision model. For example, assume that the machine-learned computer vision model has an encoder-decoder architecture. Additionally, or alternatively, in some implementations, the machine-learned computer vision model can be an end-to-end multimodal model trained to process textual content to generate an image based on the textual content (e.g., a language-vision model, etc.). As such, it should be noted that the machine-learned model(s) 132 can include any type of model(s) organized in any manner sufficient to generate an image based on a textual description of the image.

Additionally, or alternatively, in some implementations, the machine-learned model(s) 132 can include models trained to generate intermediate representations of other types of information, such as audio information, or to generate textual summaries of such types of information. For example, the machine-learned model(s) 132 may include an audio encoder model trained to perform speech recognition tasks. For another example, the machine-learned model(s) 132 may include a machine-learned computer vision model trained to generate a textual summarization of the contents depicted by an image.

The machine learning module 130 can include contextual information 136. The contextual information 136 can describe various characteristics of the POI, services or goods provided by the POI, and/or occurrences or circumstances related to the POI. For example, the contextual information 136 may identify the type of goods or services provided by the POI. For another example, if the POI is a landmark, the contextual information 136 may include historical information related to the POI.

In some implementations, the contextual information 136 can include temporal information. The temporal information can be contextual information that is time-sensitive, such as a change in seasons, current or predicted weather, current or predicted traffic conditions, current or planned event associated with the POI, a recent or planned modification to the POI, etc. For example, a business entity associated with an event space POI may upload information to the profile of the POI indicating that the POI is hosting an electronic music festival in the near future. The contextual information 136 can include the information, or can otherwise indicate the planned electronic music festival. In this manner, representation images can be selected with the most relevance to planned events or predicted occurrences.

In some implementations, the contextual information 136 can be, or otherwise include, a prompt for the machine-learned model(s) 132. For example, the contextual information 136 can include a prompt instructing the machine-learned model(s) 132 to generate an image which depicts the POI and includes each of the visual descriptors 128. For another example, the contextual information 136 can include a prompt instructing the machine-learned model(s) to generate an image based on some of the visual descriptors 128. In some implementations, the contextual information 136 can include a prompt based on the contextual information 136 itself. For example, the contextual information 136 can include information indicating an imminent change in seasons from a current season to a subsequent season. The prompt can instruct the machine-learned model(s) 132 to depict the POI during the subsequent season, rather than the current season. In this manner, prompt(s) processed alongside the visual descriptors 128 can increase the accuracy of the machine-learned model(s) 132.

The representation image identifier 118 can process model input(s) 138 with the machine-learned model(s) 132 to obtain a query image 140. The model input(s) 138 can include the visual descriptors 128, the contextual information 136, etc. The query image 140 can depict an "ideal" depiction of the POI based on the visual descriptors 128. For example, if the visual descriptors include descriptions of fall foliage, the query image 140 is likely to depict fall foliage.

The representation image identifier 118 can include a visual similarity identifier 142. The visual similarity identifier 142 can include the query image 140 and a corpus of visual UGC 144. Similar to the corpus of textual UGC 122, the corpus of visual UGC 144 can include some, or all, of the UGC images 114 of the visual UGC repository 112. Further, the corpus of visual UGC 144 can be filtered in the same manner as described with regards to the corpus of textual UGC 122.

The visual similarity identifier 142 can determine a visual similarity between the query image 140 and each image of the corpus of visual UGC 144. Based on the visual similarities, the visual similarity identifier 142 can select a representation image 146 from the images included in the corpus of visual UGC 144. By selecting the UGC image 114 that is most visually similar to the "ideal" depiction of the POI provided by the query image 140, the representation image identifier 118 can identify an optimal image to serve as the representation image 146.

It should be noted that, in some implementations, the query image 140 may not be generated using the machine-learned generative vision model 214. Rather, the machine-learned generative vision model 214 can instead be used to generate an embedding from which the query image 140 can be generated. More specifically, some generative vision models are structured to include an encoder portion and a decoder portion. The encoder portion can process some input(s) to generate an intermediate representation of the input, such as an embedding. The decoder portion can process the embedding to generate the query image 140. However, performing a generative task with the decoder portion can be computationally expensive. As such, rather than generating the query image 140, the encoder portion of the machine-learned generative vision model 214 can process the model inputs 138 to generate an embedding. Once generated, a similarity can be determined between the embedding and other embeddings generated from the UGC images 114. Evaluation of embeddings will be discussed in greater detail with regards to FIG. 3.

In some implementations, the representation image identifier 118 can include an evaluation event occurrence detector 148. The evaluation event occurrence detector 148 can detect the occurrence of a representation image evaluation event. A "representation image evaluation event" can be an event that provides a "cause" to evaluate, or re-evaluate, a current representation image for a POI profile. In some implementations, the representation image evaluation event can be a regularly scheduled event that repeats iteratively. For example, the evaluation event occurrence detector 148 can detect a representation image evaluation event by detecting passage of a pre-determined period of time subsequent to detecting a prior representation image evaluation event. In other words, every time the representation image is evaluated or re-evaluated, the evaluation event occurrence detector 148 can initialize a timer that can cause a subsequent evaluation event once expired.

In some implementations, the evaluation event occurrence detector 148 can detect occurrence of the representation image evaluation event by receiving information indicative of a request to evaluate the representation image. For example, the computing system 102, or some other computing entity associated with the computing system 102, can provide the request to the computing system. For another example, the computing system 102 can receive the request from a user (e.g., a user associated with the POI such as an employee, etc.). In some implementations, the evaluation event occurrence detector 148 can detect occurrence of the representation image evaluation event by determining that seasonal conditions depicted in the representation image currently used to represent the particular POI differ from current seasonal conditions.

In some implementations, the evaluation event occurrence detector 148 can detect occurrence of the representation image evaluation event based on user feedback for a current representation image. For example, the evaluation event occurrence detector 148 can obtain user feedback information indicative of a degree of representative accuracy of the representation image currently used to represent the particular POI. The evaluation event occurrence detector 148 can determine that the degree of representative accuracy of the representation image currently used to represent the particular POI is less than a threshold degree of representative accuracy.

Figure 2:
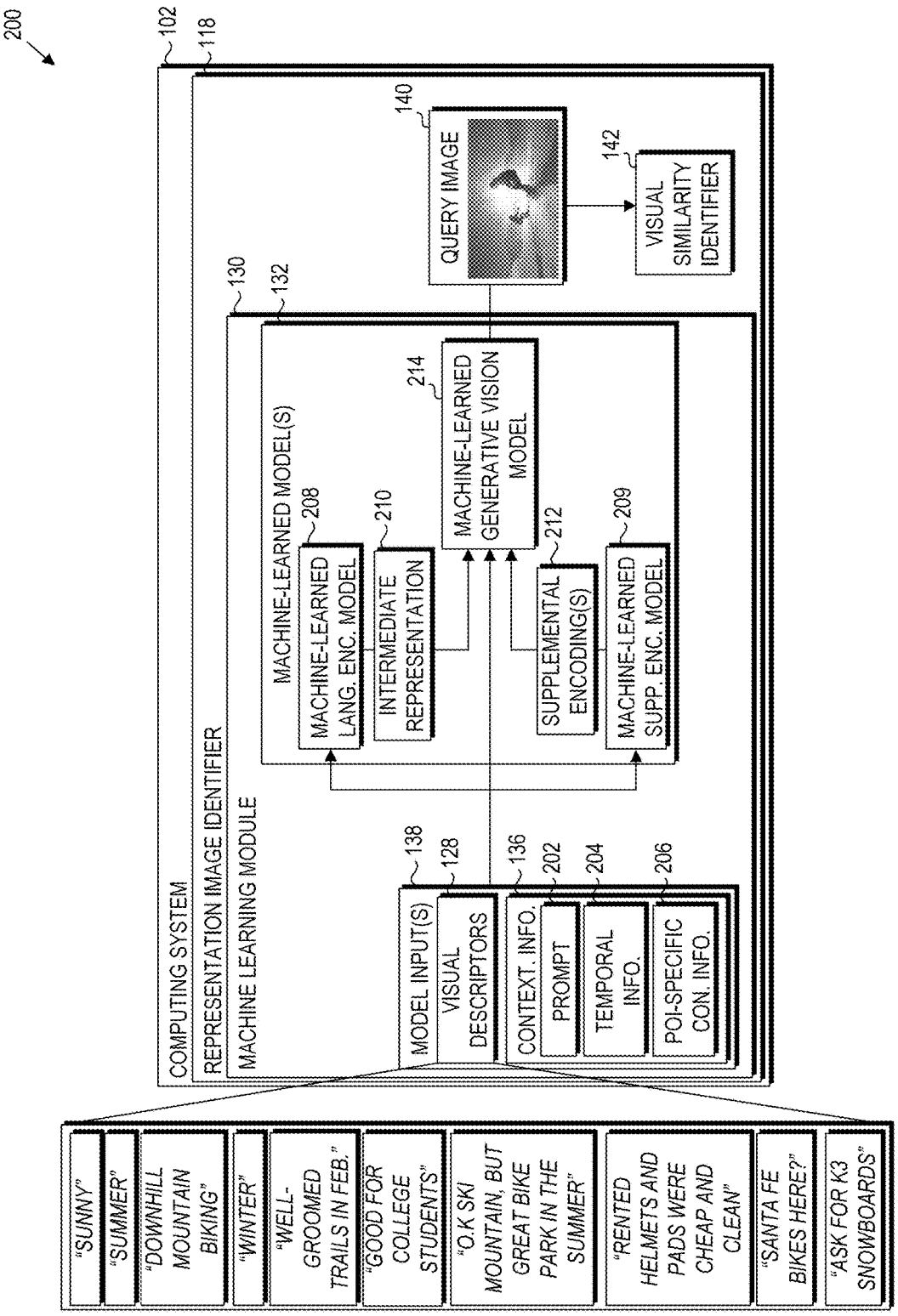
FIG. 2 is a block diagram of a computing system including a machine learning module to leverage generative machine-learned models for selection of representation images for POIs according to some implementations of the present disclosure.

FIG. 2 is a block diagram 200 of a computing system including a machine learning module to leverage generative machine-learned models for selection of representation images for POIs according to some implementations of the present disclosure. FIG. 2 will be discussed in conjunction with FIG. 1. Specifically, the computing system 102 (e.g., the computing system 102 of FIG. 1, etc.) can include the representation image identifier 118. The representation image identifier 118 can include the machine learning module 130. The machine learning module 130 can include the machine-learned models 132, the model information 134, the contextual information 136, and the model input(s) 138.

The computing system 102 can obtain the set of model input(s) 138. The set of model input(s) 138 can include the visual descriptors 128. As depicted, the visual descriptors 128 can be visual descriptors extracted from textual content items (e.g., reviews) submitted by users for the POI. To follow the depicted example, the POI can be a ski resort that operates as a mountain biking park in the off-season. For example, the visual descriptors include descriptors such as "downhill mountain biking," "summer," "winter," " . . . ski mountain," "Santa Fe bikes," "K3 snowboards," etc. In turn, the visual descriptors 128 can determine the image generated.

In some implementations, the model input(s) 138 can include the contextual information 136. In some implementations, the contextual information 136 can include prompt (s) 202. The prompt(s) 202 can be, or include, one or more prompts for the machine-learned models. In some implementations, the prompt(s) 202 can be textual content. Alternatively, in some implementations, the prompt(s) 202 can be encoded prior to processing with the machine-learned model (s) 132. For example, the prompt(s) 202 can be encoded as an intermediate representation prior to processing.

In some implementations, the contextual information 136 can include temporal information 204. The temporal information 204 can include time-sensitive contextual information associated with recent occurrences, current occurrences or predicted occurrences. For example, the temporal information 204 can describe an event planned to occur at a POI in the near future. For another example, the temporal information 204 can include current weather conditions and/or predicted weather conditions. For another example, the temporal information 204 can include seasonal information (e.g., information indicating the start of a new season, etc.). In some implementations, the temporal information 204 can describe recent or planned modifications to the POI. For example, the temporal information 204 can indicate that a POI just underwent renovations. For another example, the temporal information 204 can indicate that the POI moved to a different building. For yet another example, the temporal information 204 can indicate that modifications were made to materials associated with the POI (e.g., a new menu for a restaurant, new operating hours for a business, new services provided by a service provider, etc.).

Additionally, or alternatively, in some implementations, the temporal information 204 can describe a recent or planned modification to another POI associated with a particular POI. For example, assume that the POI is Yosemite national park, which includes a number of different hotels and resorts located in the valley of the park. If one of the hotels located inside Yosemite national park undergoes exterior renovations, the temporal information 204 can indicate as such.

Additionally, or alternatively, in some implementations, the contextual information 136 can include POI-specific contextual information 206. The POI-specific contextual information 206 can include contextual information specific to a particular POI, and/or a particular type of POI. For example, assume that the POI is a fast food restaurant with regional variations in menu offerings. The POI-specific contextual information 206 can include information describing characteristics of the particular restaurant (e.g., the menu offerings specific to that restaurant), and/or can include information describing characteristics of fast food restaurants generally (e.g., information related to a drive-through ordering system, etc.). For another example, if the POI is a national park, the POI-specific contextual information 206 can include or otherwise indicate a park map, rules within the park, information for gaining admittance to the park, etc.

The machine-learned model(s) 132 can process the model input(s) 138 to obtain the query image 140. In some implementations, the machine-learned model(s) 132 can include a machine-learned language encoder model 208. The machine-learned language encoder model 208 can be trained to perform various language tasks. In some implementations, the machine-learned language encoder model 208 can be trained to process some, or all, of the model input(s) 138 to obtain an intermediate representation 210 of the inputs. The intermediate representation 210 can be any type or manner of lower-dimensional representation of the input(s) to the machine-learned language encoder model 208.

In some implementations, the machine-learned language encoder model 208 can include a decoder model to perform generative language tasks. In some implementations, the machine-learned language encoder model 208 can be utilized to extract the visual descriptors 128 from the textual content items 110. For example, the machine-learned language encoder model 208 can process the textual content items 110 and the prompt 202. The prompt 202 can include a request to extract the visual descriptors. For example, the prompt may include a request such as "describe the place in a single paragraph that can aid an artist to paint a picture of the place. Your description should use the visual elements mentioned in the reviews about the place given below. Be precise and succinct."

In some implementations, the machine-learned model(s) 132 can include a machine-learned supplemental encoding model 209. The machine-learned supplemental encoding model 210 can be any type or manner of encoder model trained to process inputs and generate a supplemental encoding 212 of the inputs. For example, assume that the model input(s) 138 include a recording of a user providing a verbal review of a POI. The machine-learned supplemental encoding model 209 can process the recording to obtain a supplemental encoding 212 that represents the recording.

The machine-learned model(s) 132 can include a machine-learned generative vision model 214. The machine-learned generative vision model 214 can be trained to process an input to generate an image based on the inputs. More specifically, the inputs to the machine-learned generative vision model 214 can describe a particular image, or can be an intermediate representation of a description of the particular image. The machine-learned generative vision model 214 can process the inputs to obtain the query image 140, and the query image 140 can include the visual descriptors 128 processed by the machine-learned generative vision model 214.

To follow the depicted example, the machine-learned language encoder model 208 can process the visual descriptors 128 for the POI (e.g., the ski mountain) to obtain the intermediate representation 210 of the visual descriptors 128. The machine-learned generative vision model 214 can process the intermediate representation 210 to obtain the query image 140. The query image 140 can depict the POI and some, or all, of the visual descriptors 128. Here, as the visual descriptors 128 include descriptions of skiing, snowboarding, and college students, the query image can depict a younger person snowboarding on a snowy mountain. The query image 140 can be provided to the visual similarity identifier 142.

Figure 3:
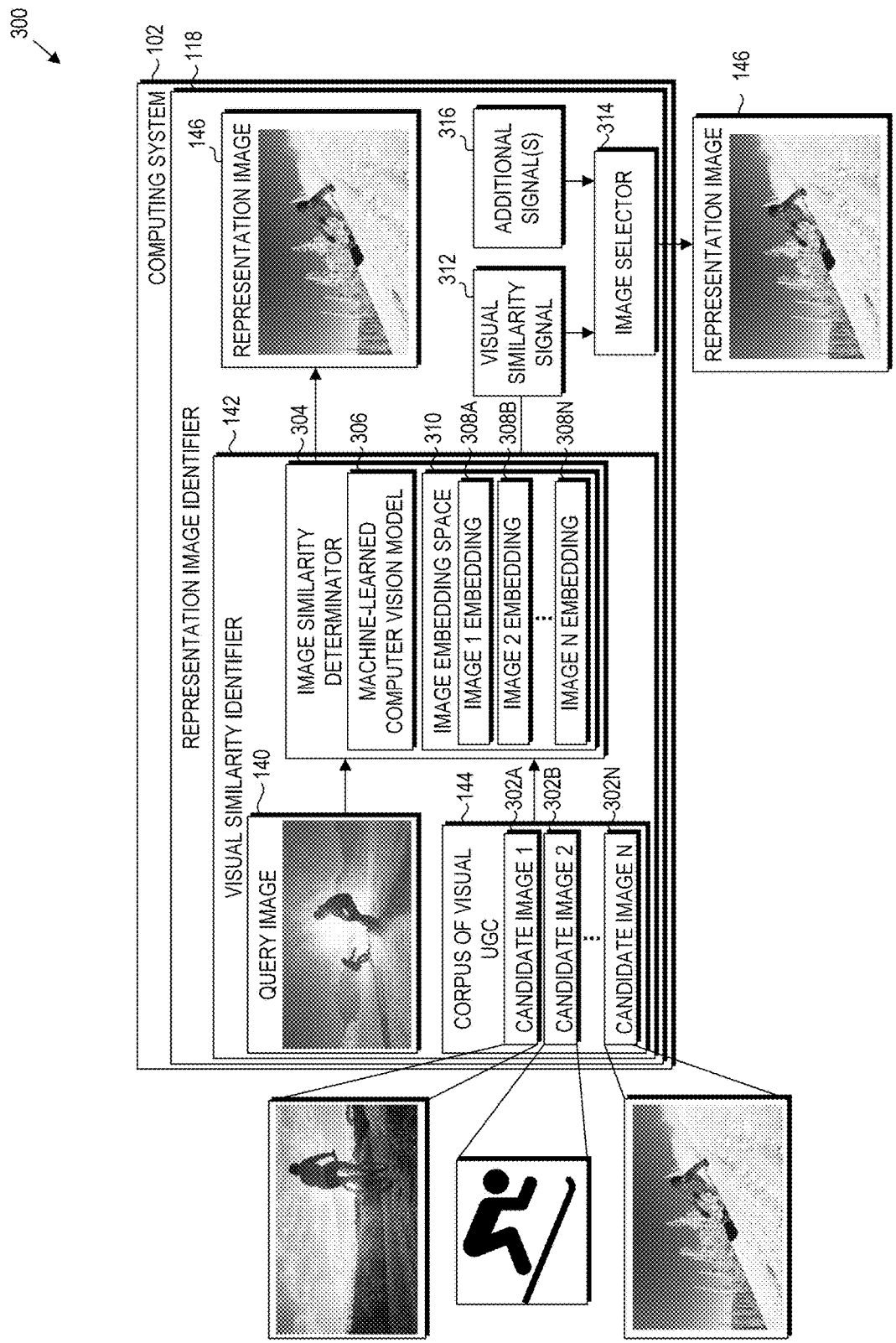
FIG. 3 is a block diagram for a computing system that identifies representation images from a corpus of user-generated content based on a visual similarity between the images and a query image according to some implementations of the present disclosure.

FIG. 3 is a block diagram 300 for a computing system that identifies representation images from a corpus of user-generated content based on a visual similarity between the images and a query image according to some implementations of the present disclosure. FIG. 3 will be discussed in conjunction with FIGS. 1 and 2. Specifically, the computing system 102 can include the representation image identifier 118, which can include the visual similarity identifier 142. The visual similarity identifier 142 can obtain the query image 140 as described with regards to FIG. 2.

The visual similarity identifier 142 can also include the corpus of visual UGC 144. The corpus of visual UGC 144 can include candidate images 302A-302N (generally, candidate images 302). The candidate images can be candidates for selection as a representation image for the POI, and can include some, or all, of the UGC images 114 included in the visual UGC repository 112. Specifically, in some implementations, the visual similarity identifier 142 can filter some of the UGC images 114 from inclusion in the corpus of visual UGC as one of the candidate images 302. For example, the visual similarity identifier 142 may filter the UGC images 114 from the corpus of visual UGC based on a quality metric associated with the image. For example, if the quality metric associated with the UGC image 114A is above a threshold quality metric, the UGC image 114A can be selected for inclusion in the corpus of visual UGC 144 as the candidate image 302A. Conversely, if the quality metric associated with the UGC image 114B is below a threshold quality metric, the visual similarity identifier 142 can refrain from including the UGC image 114B in the corpus of visual UGC 144. In this manner, the visual similarity identifier 142 can reduce the computational costs of evaluating visual similarity by reducing the total number of images to be evaluated.

The visual similarity identifier 142 can include an image similarity determinator 304. The image similarity determinator 304 can determine a visual similarity between the query image 140 and each of the candidate images 302. In some implementations, the image similarity determinator 304 can include a machine-learned computer vision model 306, or can access such a model if the model is handled by the machine learning module 130. The machine-learned computer vision model 306 can identify a degree of visual similarity between images. In some implementations, the machine-learned computer vision model 306 can be a model trained to perform a semantic analysis of visual similarity between images. More specifically, the machine-learned computer vision model 306 can be trained to determine the similarity between images based on a semantic understanding of the images. For example, the candidate image 302A depicts a mountain biker, the candidate image 302B depicts an icon representation of a person skiing, and the candidate image 302N depicts a person snowboarding. Here, the query image 140 and the candidate image 302A are more "visually similar" from a surface-level view than the query image 140 and the candidate image 302B. However, the concept illustrated by candidate image 302B is more visually similar to the query image 140 than the concept illustrated by the candidate image 302A (e.g., biking vs skiing). In this manner, the machine-learned computer vision model 306 can determine visual similarity on a per-pixel basis and/or a conceptual basis.

In some implementations, the machine-learned computer vision model 306 can generate embeddings 308A-308N (generally, embeddings 308) for the query image 140 and the candidate images 302. Alternatively, in some implementations, the computing system 102 can obtain or otherwise access the image embeddings 308 alongside the candidate images 302, or may obtain the embeddings 308 and information that associates the embeddings 308 with the candidate images 302.

As described previously, in some implementations, the machine-learned generative vision model 214 can be utilized generate an intermediate representation, such as an embedding, from which the query image 140 can be derived. In this manner, implementations described herein can retain the benefits of the query image 140 while substantially reducing the computational cost associated with generative image tasks.

For example, the image similarity determinator 304 can obtain the embedding for the query image 140. The image similarity determinator 304 can map the embedding for the query image 140 to an image embedding space 310. The image similarity determinator 304 can determine a distance between the embedding for the query image 140 and the image embeddings 308. The distance between embeddings in the image embedding space 310 can indicate a visual similarity between corresponding images, with embeddings located closer together being more visually similar than embeddings located further apart. As such, the image similarity determinator 304 can identify a candidate image 302 that is visually similar to the representation image 146 by determining the distance between the embedding for the query image 140 and the embedding for the candidate image 302 within the image embedding space 310.

For example, assume that the embedding 308A represents the query image 140, the embedding 308B represents the candidate image 302B, and that the embedding 308N represents the candidate image 302N. If the distance between the embeddings 308A and 308N within the image embedding space 310 is less than the distance between the embeddings 308A and 308B, the image similarity determinator 304 can determine that the candidate image 302N is more visually similar to the query image 140 than the candidate image 302B.

In some implementations, the visual similarity identifier 142 can select the representation image 146 based on the visual similarity. To follow the depicted example, the visual similarity identifier 142 can select the candidate image 302N as the representation image 146 based on the close visual similarity between the query image 140 and the candidate image 302N.

Additionally, or alternatively, in some implementations, the visual similarity identifier 142 can generate a visual similarity signal 312. The visual similarity signal 312 can indicate the degree of visual similarity between the query image 140 and each of the candidate images 302. The visual similarity signal 312 can be one of multiple signals analyzed to select the representation image 146. For example, the representation image identifier 118 can include image selector 314. The image selector 314 can select the candidate image 302N as the representation image 146 based on the visual similarity signal 312 and additional signal(s) 316.

The additional signal(s) 316 can include any type or manner of signal based on the content of the candidate images 302, an evaluation of the candidate images 302, user interactions with the candidate images 302, etc. For example, the additional signal(s) 316 can include a feedback signal indicative of user feedback received for some (or all) of the candidate images 302. For another example, the additional signal(s) 316 can include a content signal indicating a degree of likelihood that the content of a candidate image is inappropriate or sensitive. For another example, the additional signal(s) 316 can include a recency signal based on the length of time that has passed since a particular candidate image was captured. For another example, the additional signal(s) 316 can include a relevancy signal indicating a degree of relevance between a candidate image and the POI. For yet another example, the additional signal(s) 316 can include a privacy signal indicative of a degree of likelihood that the content of the candidate image presents a privacy risk (e.g., an image depicting the faces of multiple persons may present more of a privacy risk than an image depicting snowboarders with full face coverings). The image selector 314 can evaluate the visual similarity signal 312 and the additional signals 316 to identify the candidate image 302N as the representation image 146.

Figure 4:
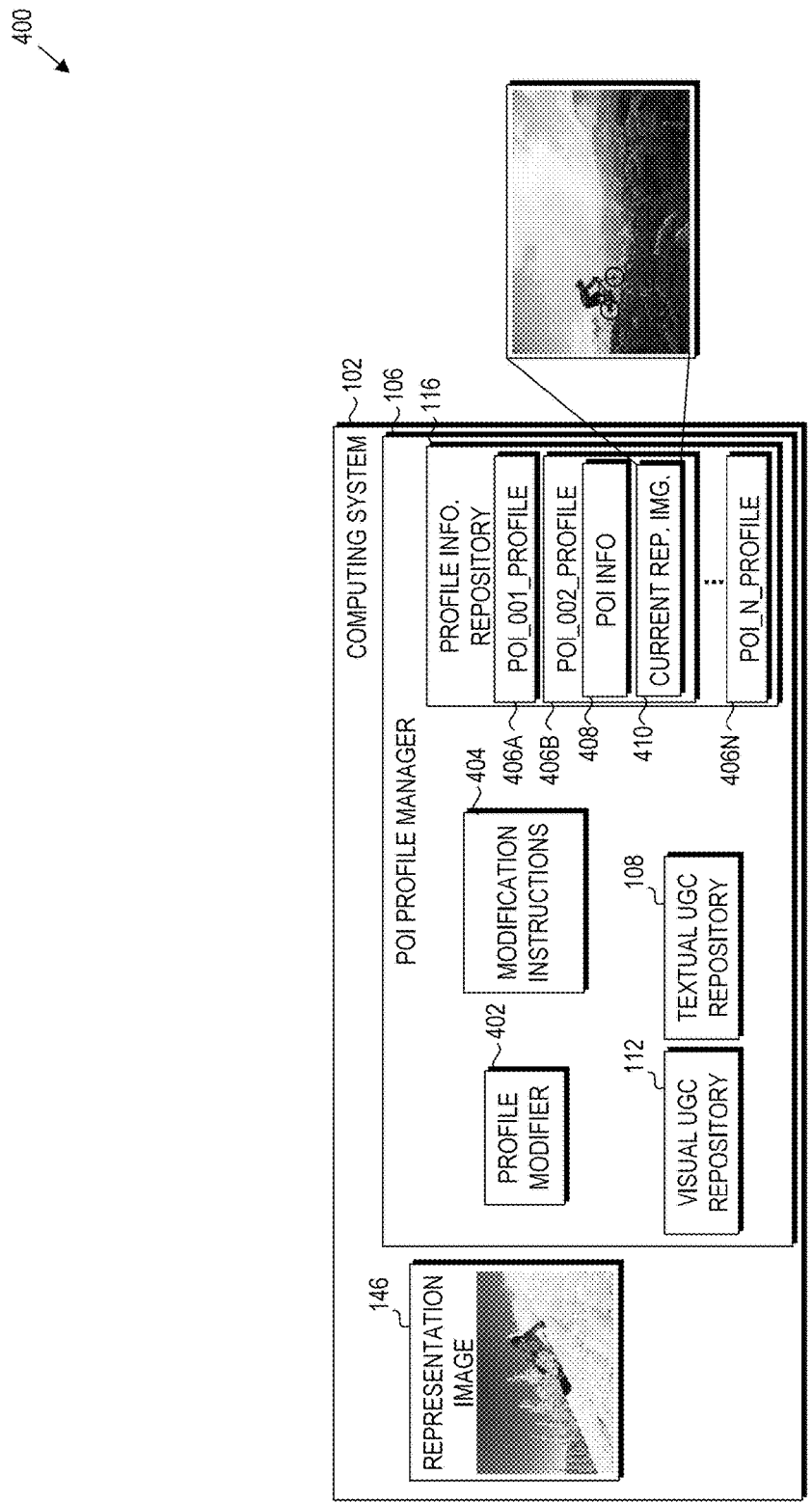
FIG. 4 is a block diagram for a computing system that modifies POI profiles to replace existing representation images with newly selected representation images according to some implementations of the present disclosure.

FIG. 4 is a block diagram 400 for a computing system that modifies POI profiles to replace existing representation images with newly selected representation images according to some implementations of the present disclosure. FIG. 4 will be discussed in conjunction with FIGS. 1-3. Specifically, the computing system 102 can include the POI profile manager 106 of FIG. 1. The POI profile manager 106 can include the textual UGC repository 108 the visual UGC repository 112, and the profile information repository 116.

The POI profile manager 106 can include a profile modifier 402. The profile modifier 402 can generate modification instructions 404 based on the representation image 146. More specifically, the profile modifier 402 can generate modification instructions 404 that include instructions to modify an existing profile for the POI to replace a current representation image 410 with the representation image 146. For example, the profile information repository 116 can include profiles 406A-406N (generally, profiles 406). Each of the profiles can include POI information 408 and a current representation image 410. The POI information 408 can include information to be presented to the user within the profile for the POI, such as operating hours, menus for restaurants, services offered, etc. The current representation image 410 can be the representation image currently displayed to users within the profile for the POI. The modification instructions 404 can be provided to the profile information repository 116, and can instruct the profile information repository 116 to replace the current representation image 410 with the representation image 146. In this manner, the computing system 102 can cause replacement of an existing representation image with a newly identified representation image.

Figure 5:
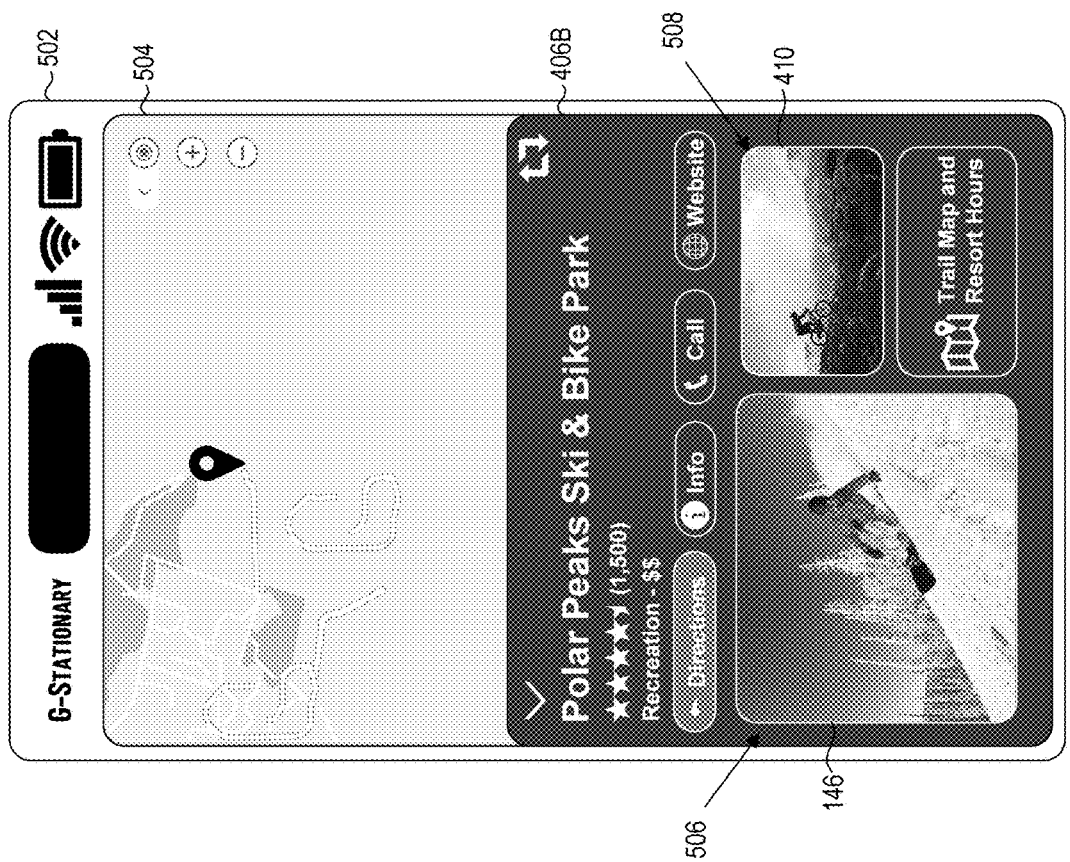
FIG. 5 illustrates an example profile for a particular POI within a mapping application associated with a mapping service according to some implementations of the present disclosure.

FIG. 5 illustrates an example profile for a particular POI within a mapping application associated with a mapping service according to some implementations of the present disclosure. FIG. 5 will be discussed in conjunction with FIGS. 1-4. Specifically, a user computing device 502 (e.g., a smartphone, laptop, wearable computing device, tablet, etc.) can execute an application 504. The application 504 can be associated with an application-based service such as a navigation service or mapping service. The application 504 can maintain profiles for various POIs that can be discovered via the application 504.

To follow the depicted example, a user can select a skiing area POI called "polar peaks." In response, the application-based service can transmit the profile 406B for the skiing area to the user computing device 502. The profile 406B can be displayed within the application 504 at the user computing device 502. As depicted, the representation image 146 can be placed in a location 506 of prominence within the profile 406B. In this manner, the representation image 146 can serve as a "first impression" for the user that also provides a visual summarization of the POI. In some implementations, the profile 406B can include current and/or prior representation images, such as current representation image 410, and can place the prior representation images in locations that are less prominent than the location 506, such as the location 508.

Figure 6:
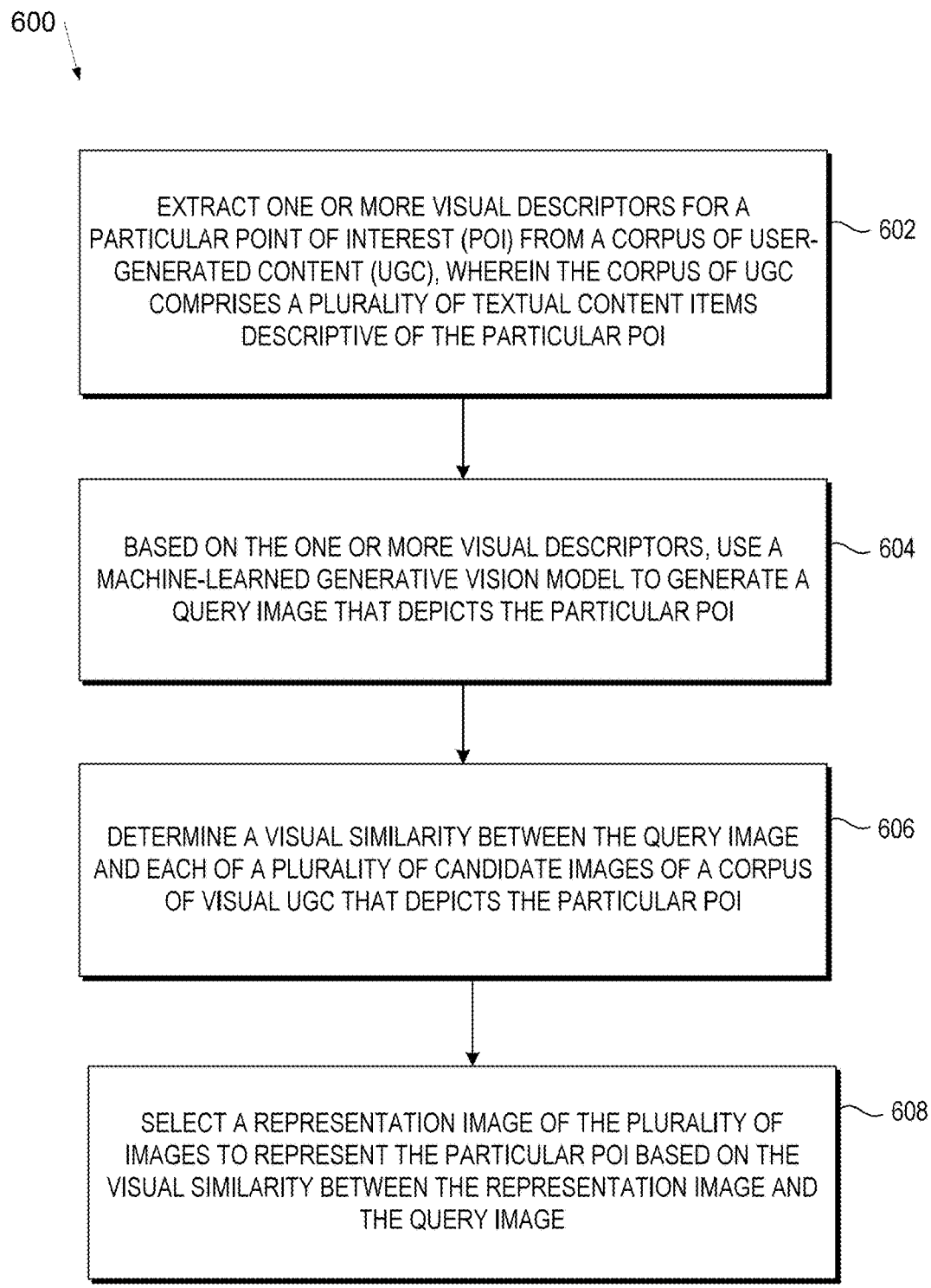
FIG. 6 depicts a flow chart diagram of an example method to perform representation image selection according to example embodiments of the present disclosure.

FIG. 6 depicts a flow chart diagram of an example method 600 to perform representation image selection according to example embodiments of the present disclosure. Although FIG. 6 depicts operations performed in a particular order for purposes of illustration and discussion, the methods of the present disclosure are not limited to the particularly illustrated order or arrangement. The various operations of the method 600 can be omitted, rearranged, combined, and/or adapted in various ways without deviating from the scope of the present disclosure.

At operation 602, a computing system can extract one or more visual descriptors for a particular POI from a corpus of UGC. The corpus of UGC can include a plurality of textual content items descriptive of the particular POI. In some implementations, prior to extracting the visual descriptors, the computing system can detect occurrence of a representation image evaluation event. In some implementations, the computing system can detect passage of a pre-determined period of time subsequent to detection of a prior representation image evaluation event. In some implementations, the computing system can receive information indicative of a request to evaluate the representation image. In some implementations, the computing system can determine that seasonal conditions depicted in the representation image currently used to represent the particular POI differ from current seasonal conditions.

Additionally, or alternatively, in some implementations, prior to extracting the visual descriptor(s), the computing system can select a subset of textual content items from the plurality of textual content items based at least in part on user feedback information associated with the subset of textual content items. The computing system can extract the one or more visual descriptors for the particular POI from the subset of textual content items. In some implementations, each of the subset of textual content items can include a review of the particular POI written by a user.

In some implementations, the computing system can obtain user feedback information indicative of a degree of representative accuracy of the representation image currently used to represent the particular POI. The computing system can determine that the degree of representative accuracy of the representation image currently used to represent the particular POI is less than a threshold degree of representative accuracy.

At operation 604, the computing system can, based on the one or more visual descriptors, use a machine-learned generative vision model to generate a query image that depicts the particular POI. In some implementations, the computing system can use the model by processing the one or more visual descriptors with a language encoder model to obtain an intermediate representation. The computing system can process the intermediate representation of the one or more visual descriptors with the machine-learned generative vision model to generate the query image. In some implementations, the computing system can process the one or more visual descriptors and a set of contextual information with the language encoder model to obtain the intermediate representation.

In some implementations, the set of contextual information can include prompt information indicative of instructions to generate a depiction of the particular POI that includes the one or more visual descriptors. Additionally, or alternatively, in some implementations, the set of contextual information can include the set of contextual information can include temporal context information. The temporal context information can indicate current seasonal conditions, current or predicted weather conditions, current or predicted traffic conditions, a current or planned event associated with the particular POI, a recent or planned modification to the particular POI, a recent or planned modification to another POI associated with the particular POI, etc.

At operation 606, the computing system can determine a visual similarity between the query image and each of a plurality of candidate images of a corpus of visual UGC that depicts the particular POI.

At operation 608, the computing system can select a representation image of the plurality of images to represent the particular POI based on the visual similarity between the representation image and the query image.

Figure 7A:
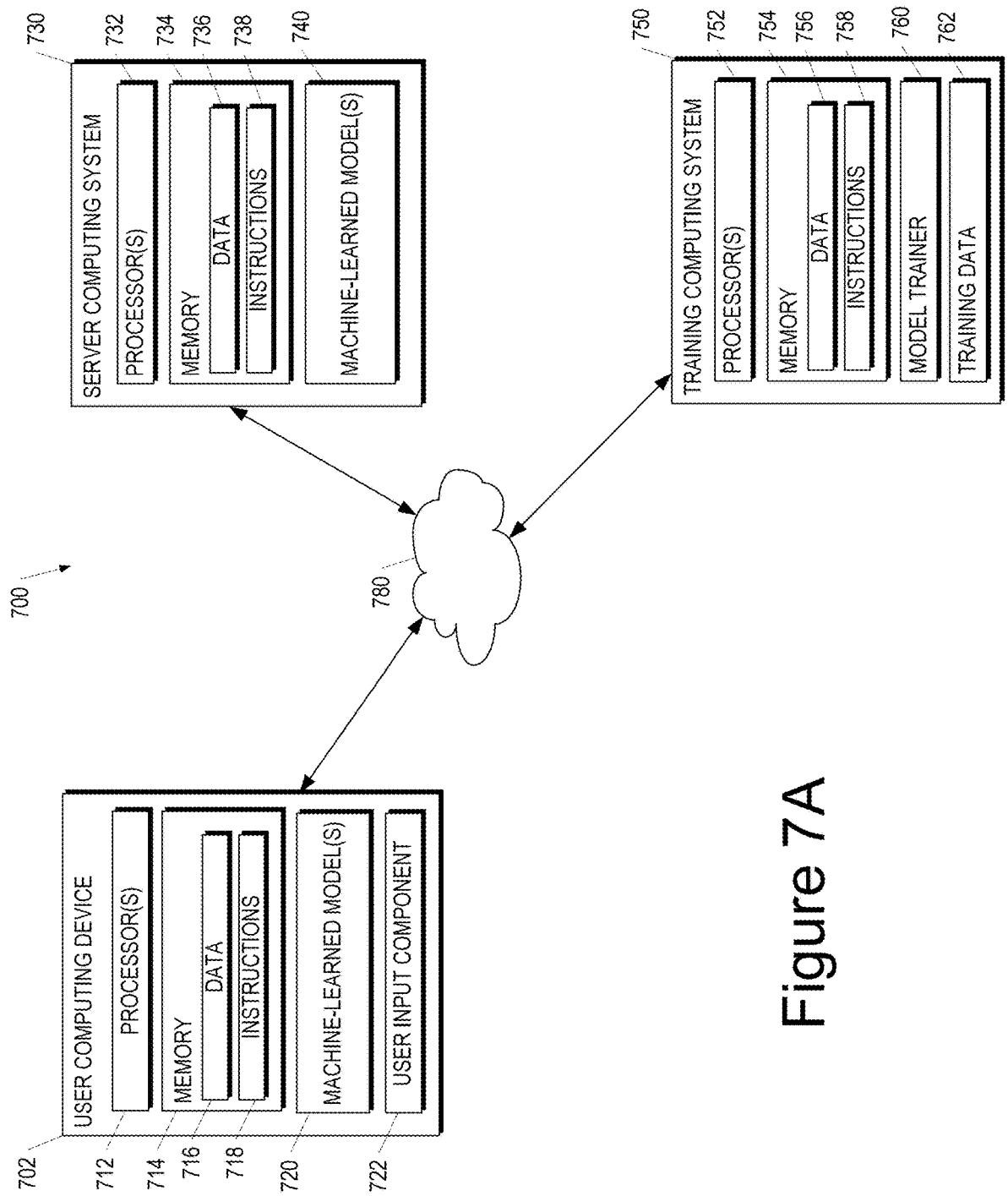
FIG. 7A depicts a block diagram of an example computing system that performs selection of representation images for POI profiles according to example embodiments of the present disclosure.

FIG. 7A depicts a block diagram of an example computing system 700 that performs selection of representation images for POI profiles according to example embodiments of the present disclosure. The system 700 includes a user computing device 702, a server computing system 730, and a training computing system 750 that are communicatively coupled over a network 780.

The user computing device 702 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 702 includes one or more processors 712 and a memory 714. The one or more processors 712 can be any suitable processing device (e.g., a processor core, a microprocessor, an ASIC, an FPGA, a controller, a microcontroller, etc.) and can be one processor or a plurality of processors that are operatively connected. The memory 714 can include one or more non-transitory computer-readable storage media, such as RAM, ROM, EEPROM, EPROM, flash memory devices, magnetic disks, etc., and combinations thereof. The memory 714 can store data 716 and instructions 718 which are executed by the processor 712 to cause the user computing device 702 to perform operations.

In some implementations, the user computing device 702 can store or include one or more models 720. For example, the models 720 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more models 720 can be received from the server computing system 730 over network 780, stored in the user computing device memory 714, and then used or otherwise implemented by the one or more processors 712. In some implementations, the user computing device 702 can implement multiple parallel instances of a single model 720 (e.g., to perform parallel generative tasks across multiple instances of the model).

Additionally, or alternatively, one or more models 740 can be included in or otherwise stored and implemented by the server computing system 730 that communicates with the user computing device 702 according to a client-server relationship. For example, the models 740 can be implemented by the server computing system 730 as a portion of a web service (e.g., a mapping service, a visual search service, etc.). Thus, one or more models 720 can be stored and implemented at the user computing device 702 and/or one or more models 740 can be stored and implemented at the server computing system 730.

The user computing device 702 can also include one or more user input components 722 that receives user input. For example, the user input component 722 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 730 includes one or more processors 732 and a memory 734. The one or more processors 732 can be any suitable processing device (e.g., a processor core, a microprocessor, an ASIC, an FPGA, a controller, a microcontroller, etc.) and can be one processor or a plurality of processors that are operatively connected. The memory 734 can include one or more non-transitory computer-readable storage media, such as RAM, ROM, EEPROM, EPROM, flash memory devices, magnetic disks, etc., and combinations thereof. The memory 734 can store data 736 and instructions 738 which are executed by the processor 732 to cause the server computing system 730 to perform operations.

In some implementations, the server computing system 730 includes or is otherwise implemented by one or more server computing devices. In instances in which the server computing system 730 includes plural server computing devices, such server computing devices can operate according to sequential computing architectures, parallel computing architectures, or some combination thereof.

As described above, the server computing system 730 can store or otherwise include one or more models 740. For example, the models 740 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). In particular, the models 740 can include the machine-learned model(s) 132 discussed with regards to FIGS. 1 and 2.

The user computing device 702 and/or the server computing system 730 can train the models 720 and/or 740 via interaction with the training computing system 750 that is communicatively coupled over the network 780. The training computing system 750 can be separate from the server computing system 730 or can be a portion of the server computing system 730.

The training computing system 750 includes one or more processors 752 and a memory 754. The one or more processors 752 can be any suitable processing device (e.g., a processor core, a microprocessor, an ASIC, an FPGA, a controller, a microcontroller, etc.) and can be one processor or a plurality of processors that are operatively connected. The memory 754 can include one or more non-transitory computer-readable storage media, such as RAM, ROM, EEPROM, EPROM, flash memory devices, magnetic disks, etc., and combinations thereof. The memory 754 can store data 756 and instructions 758 which are executed by the processor 752 to cause the training computing system 750 to perform operations. In some implementations, the training computing system 750 includes or is otherwise implemented by one or more server computing devices.

The training computing system 750 can include a model trainer 760 that trains the machine-learned models 720 and/or 740 stored at the user computing device 702 and/or the server computing system 730 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 760 can perform a number of generalization techniques (e.g., weight decays, dropouts, etc.) to improve the generalization capability of the models being trained. In particular, the model trainer 760 can train the models 720 and/or 740 based on a set of training data 762. Alternatively, in some implementations, the machine-learned model(s) 132 can be pre-trained, and thus the computing system 730 can refrain from performing additional training iterations.

In some implementations, if the user has provided consent, the training examples can be provided by the user computing device 702. Thus, in such implementations, the model 720 provided to the user computing device 702 can be trained by the training computing system 750 on user-specific data received from the user computing device 702. In some instances, this process can be referred to as personalizing the model.

The model trainer 760 includes computer logic utilized to provide desired functionality. The model trainer 760 can be implemented in hardware, firmware, and/or software controlling a general purpose processor. For example, in some implementations, the model trainer 760 includes program files stored on a storage device, loaded into a memory and executed by one or more processors. In other implementations, the model trainer 760 includes one or more sets of computer-executable instructions that are stored in a tangible computer-readable storage medium such as RAM, hard disk, or optical or magnetic media.

The network 780 can be any type of communications network, such as a local area network (e.g., intranet), wide area network (e.g., Internet), or some combination thereof and can include any number of wired or wireless links. In general, communication over the network 780 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model (s) can process the image data to generate an upscaled image data output. As another example, the machine-learned model (s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 7A illustrates one example computing system that can be used to implement the present disclosure. Other computing systems can be used as well. For example, in some implementations, the user computing device 702 can include the model trainer 760 and the training dataset 762. In such implementations, the models 720 can be both trained and used locally at the user computing device 702. In some of such implementations, the user computing device 702 can implement the model trainer 760 to personalize the models 720 based on user-specific data.

Figure 7B:
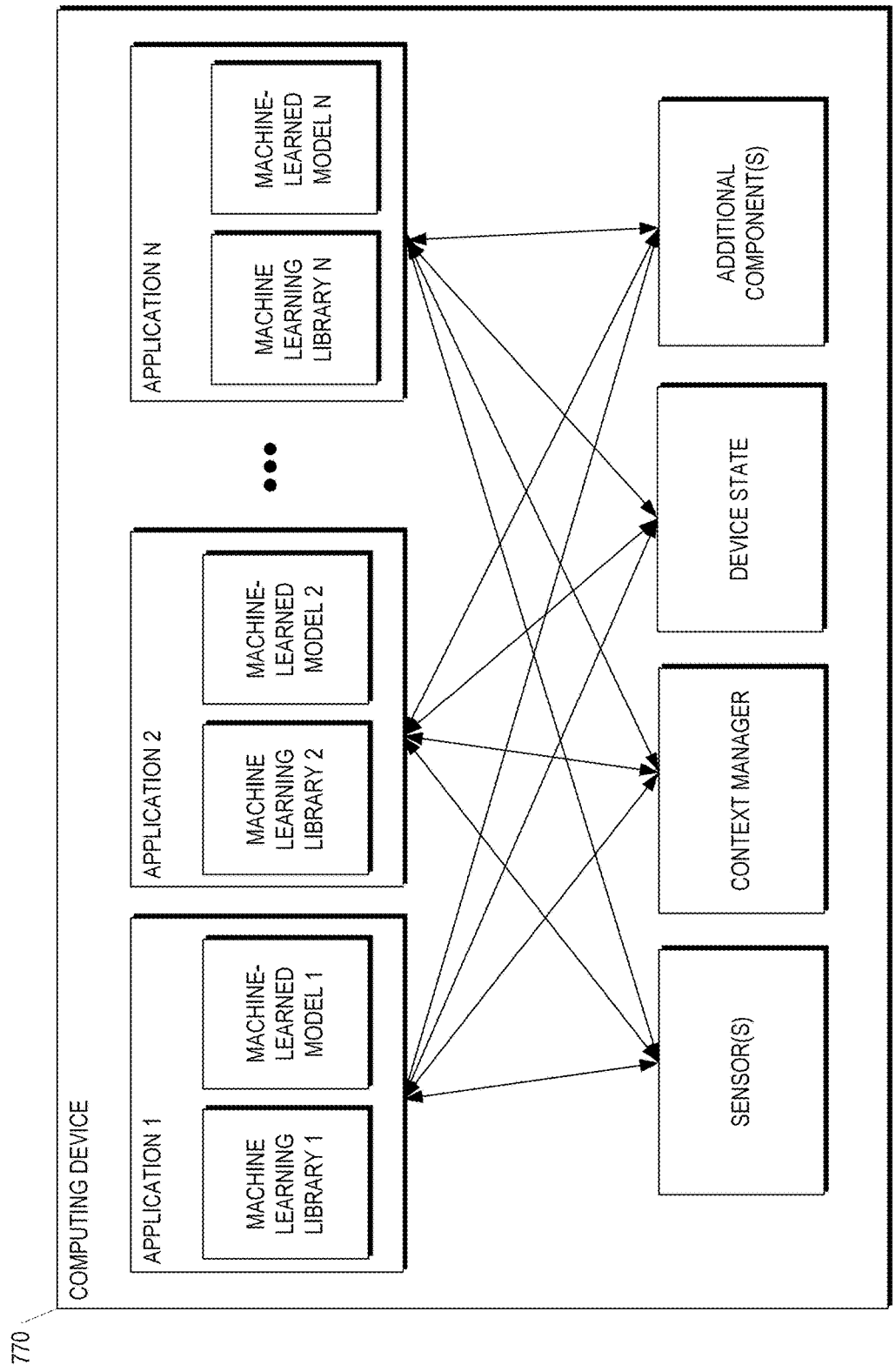
FIG. 7B depicts a block diagram of an example computing device that trains models for representation image selection according to example embodiments of the present disclosure. The computing device can be a user computing device or a server computing device.

FIG. 7B depicts a block diagram of an example computing device 770 that trains models for representation image selection according to example embodiments of the present disclosure. The computing device 770 can be a user computing device or a server computing device.

The computing device 770 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 7B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 7C:
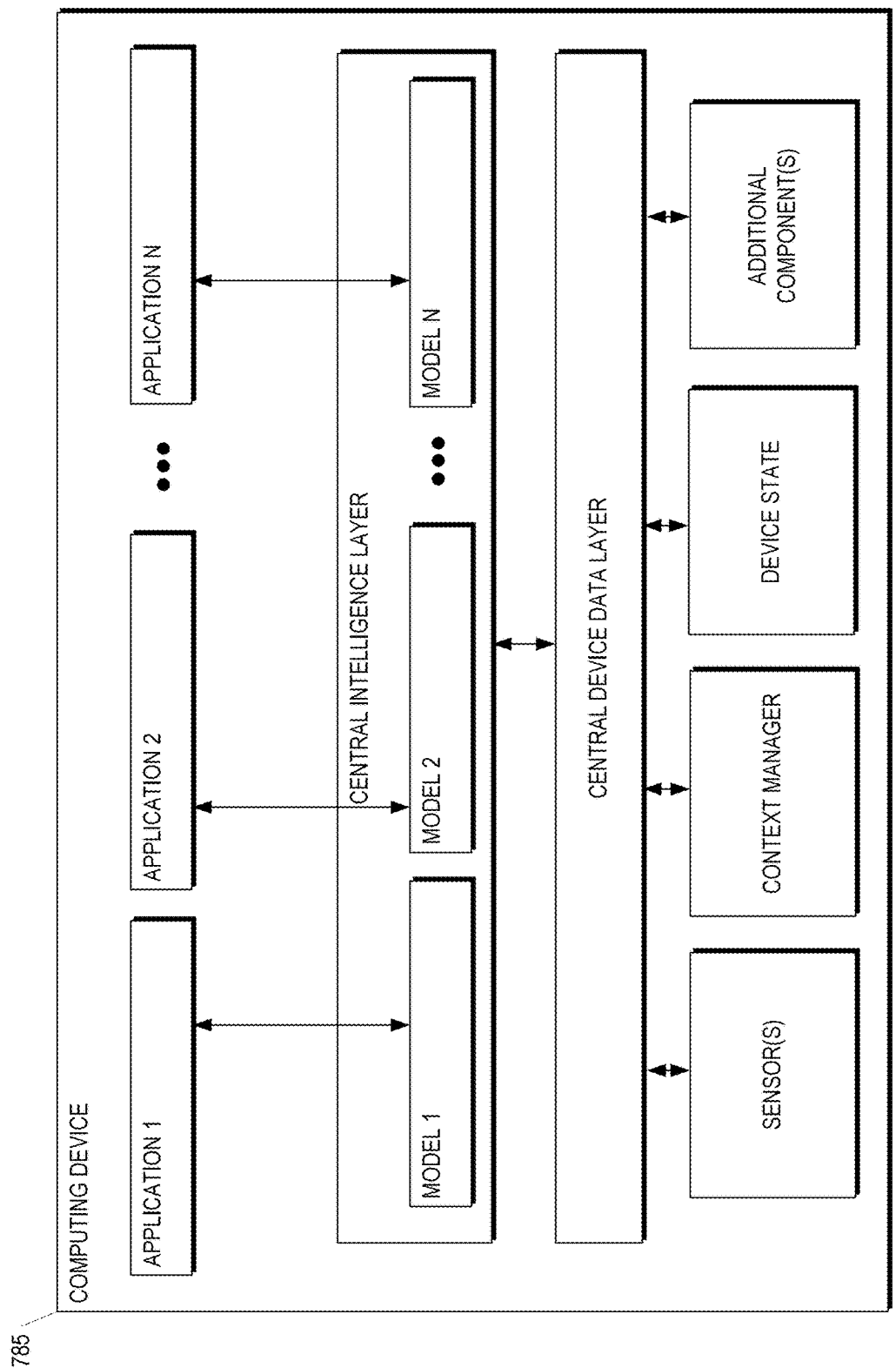
FIG. 7C depicts a block diagram of an example computing device that utilizes machine-learned models for representation image selection according to example embodiments of the present disclosure.

FIG. 7C depicts a block diagram of an example computing device 785 that utilizes machine-learned models for representation image selection according to example embodiments of the present disclosure. The computing device 785 can be a user computing device or a server computing device.

The computing device 785 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 7C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 785.

The central intelligence layer can communicate with a central device data layer. The central device data layer can be a centralized repository of data for the computing device 785. As illustrated in FIG. 7C, the central device data layer can communicate with a number of other components of the computing device, such as, for example, one or more sensors, a context manager, a device state component, and/or additional components. In some implementations, the central device data layer can communicate with each device component using an API (e.g., a private API)

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method comprising:
   extracting, by a computing system comprising one or more processor devices, one or more visual descriptors for a particular Point of Interest (POI) from a corpus of User-Generated Content (UGC), wherein the corpus of UGC comprises a plurality of textual content items descriptive of the particular POI, and wherein at least one of the one or more visual descriptors are extracted from the plurality of textual content items;
   based on the one or more visual descriptors, using, by the computing system, a machine-learned generative vision model to generate a query image that depicts the particular POI;
   determining, by the computing system, a visual similarity between the query image and each of a plurality of candidate images of a corpus of visual UGC that depicts the particular POI; and
   selecting, by the computing system, a representation image from the plurality of candidate images to represent the particular POI based on the visual similarity between the representation image and the query image.

2. The computer-implemented method of claim 1, wherein using the machine-learned generative vision model to generate the query image comprises:
processing, by the computing system, the one or more visual descriptors with a language encoder model to obtain an intermediate representation; and
processing, by the computing system, the intermediate representation of the one or more visual descriptors with the machine-learned generative vision model to generate the query image.

3. The computer-implemented method of claim 2, wherein processing the one or more visual descriptors with the language encoder model to obtain the intermediate representation comprises:
processing, by the computing system, the one or more visual descriptors and a set of contextual information with the language encoder model to obtain the intermediate representation.

4. The computer-implemented method of claim 3, wherein the set of contextual information comprises prompt information indicative of instructions to generate a depiction of the particular POI that includes the one or more visual descriptors.

5. The computer-implemented method of claim 4, wherein the set of contextual information comprises temporal context information indicative of at least one of:
current seasonal conditions;
current or predicted weather conditions;
current or predicted traffic conditions;
a current or planned event associated with the particular POI;
a recent or planned modification to the particular POI; or
a recent or planned modification to another POI associated with the particular POI.

6. The computer-implemented method of claim 5, wherein processing the one or more visual descriptors and the set of contextual information comprises:
processing, by the computing system, the one or more visual descriptors and the temporal context information with the language encoder model to obtain the intermediate representation, wherein the temporal context information is descriptive of the current season; and
wherein selecting the representation image from the plurality of candidate images comprises:
selecting, by the computing system, the representation image from the plurality of candidate images to represent the particular POI based on the visual similarity between the representation image and the query image, wherein the representation image comprises a depiction of the particular POI in current seasonal conditions, and wherein an existing representation image currently used to represent the particular POI depicts the particular POI in seasonal conditions other than the current seasonal conditions.

7. The computer-implemented method of claim 6, wherein, prior to extracting the one or more visual descriptors, the method comprises:
detecting, by the computing system, occurrence of a representation image evaluation event.

8. The computer-implemented method of claim 7, wherein detecting the occurrence of the representation image evaluation event comprises:
detecting, by the computing system, passage of a predetermined period of time subsequent to detection of a prior representation image evaluation event.

9. The computer-implemented method of claim 7, wherein detecting the occurrence of the representation image evaluation event comprises:
receiving, by the computing system, information indicative of a request to evaluate the representation image.

10. The computer-implemented method of claim 7, wherein detecting the occurrence of the representation image evaluation event comprises:
determining, by the computing system, that seasonal conditions depicted in the representation image currently used to represent the particular POI differ from current seasonal conditions.

11. The computer-implemented method of claim 7, wherein detecting the occurrence of the representation image evaluation event comprises:
obtaining, by the computing system, user feedback information indicative of a degree of representative accuracy of the representation image currently used to represent the particular POI; and
determining, by the computing system, that the degree of representative accuracy of the representation image currently used to represent the particular POI is less than a threshold degree of representative accuracy.

12. The computer-implemented method of claim 1, wherein the method further comprises:
causing, by the computing system, a representation image currently used to represent the particular POI by a service to be replaced with the representation image.

13. The computer-implemented method of claim 12, wherein the service comprises a mapping service or a visual search service.

14. The computer-implemented method of claim 1, wherein extracting the one or more visual descriptors for the particular POI comprises:
selecting, by the computing system, a subset of textual content items from the plurality of textual content items based at least in part on user feedback information associated with the subset of textual content items; and
extracting, by the computing system, the at least one of the one or more visual descriptors for the particular POI from the subset of textual content items.

15. The computer-implemented method of claim 14, wherein each of the subset of textual content items comprises a review of the particular POI written by a user.

16. A computing system, comprising:
one or more processor devices;
one or more tangible, non-transitory computer readable media storing computer-readable instructions that when executed by the one or more processor devices cause the one or more processor devices to perform operations, the operations comprising:
extracting one or more visual descriptors for a particular Point of Interest (POI) from a corpus of User-Generated Content (UGC), wherein the corpus of UGC comprises a plurality of textual content items descriptive of the particular POI, and wherein at least one of the one or more visual descriptors are extracted from the plurality of textual content items;
based on the one or more visual descriptors, using a machine-learned generative vision model to generate a query image that depicts the particular POI;
determining a visual similarity between the query image and each of a plurality of candidate images of a corpus of visual UGC that depicts the particular POI; and
selecting a representation image of the plurality of candidate images to represent the particular POI based on the visual similarity between the representation image and the query image.

17. The computing system of claim 16, wherein using the machine-learned generative vision model to generate the query image comprises:
: processing the one or more visual descriptors with a language encoder model to obtain an intermediate representation; and
: processing the intermediate representation of the one or more visual descriptors with the machine-learned generative vision model to generate the query image.

18. The computing system of claim 17, wherein processing the one or more visual descriptors with the language encoder model to obtain the intermediate representation comprises:
: processing the one or more visual descriptors and a set of contextual information with the language encoder model to obtain the intermediate representation.

19. The computing system of claim 18, wherein the set of contextual information comprises prompt information indicative of instructions to generate a depiction of the particular POI that includes the one or more visual descriptors.

20. One or more tangible, non-transitory computer readable media storing computer-readable instructions that when executed by one or more processor devices cause the one or more processor devices to perform operations, the operations comprising:
: extracting one or more visual descriptors for a particular Point of Interest (POI) from a corpus of User-Generated Content (UGC), wherein the corpus of UGC comprises a plurality of textual content items descriptive of the particular POI, and wherein at least one of the one or more visual descriptors are extracted from the plurality of textual content items;
: based on the one or more visual descriptors, using a machine-learned generative vision model to generate an embedding from which a query image that depicts the particular POI can be generated;
: determining a similarity between the embedding and each of a plurality of embeddings that respectively represent a plurality of candidate images of a corpus of visual UGC that depicts the particular POI; and
: selecting a representation image of the plurality of candidate images to represent the particular POI based on the similarity between the embedding and each of the plurality of embeddings.

* * * * *